United States Patent Office 2,726,158
Patented Dec. 6, 1955

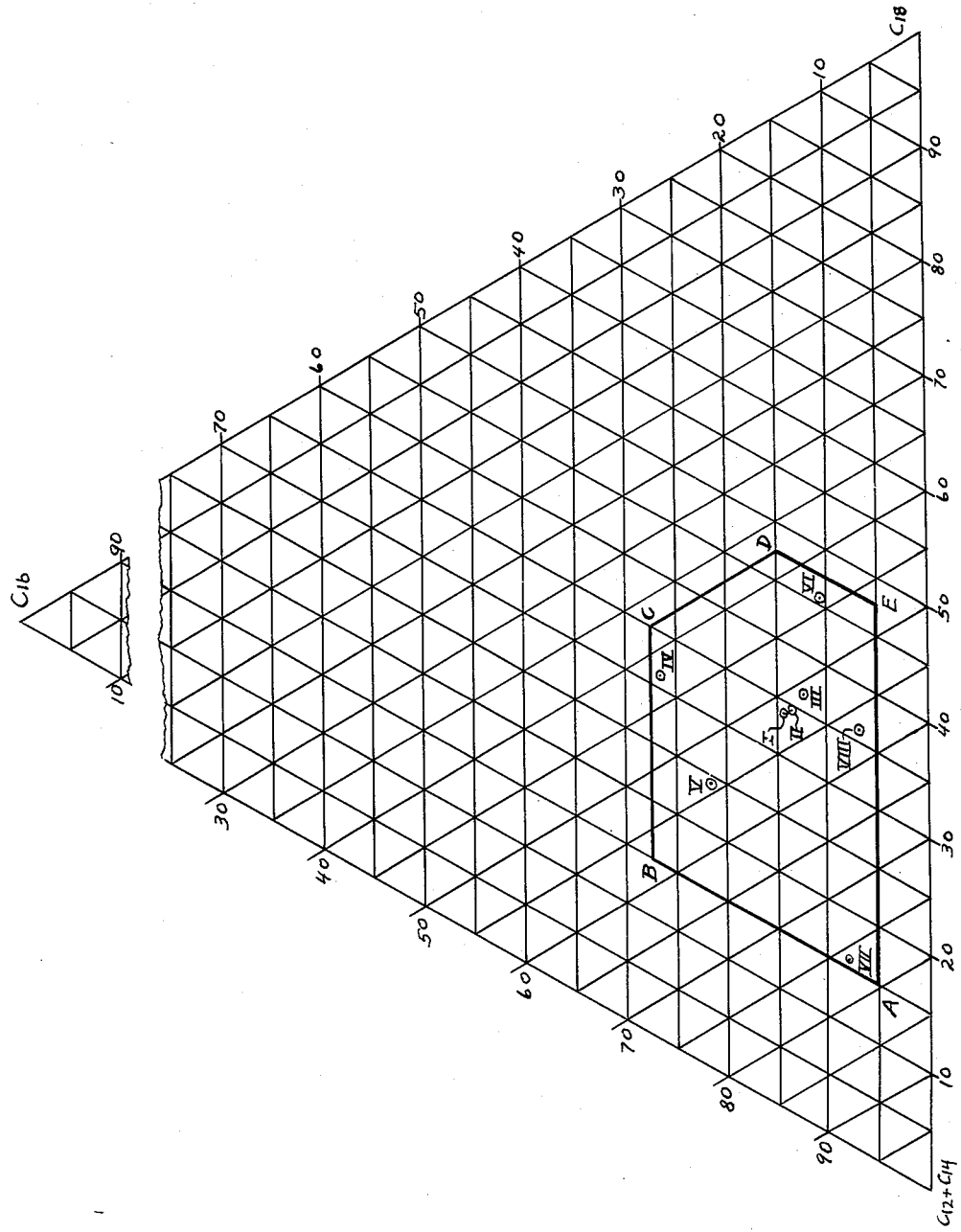

2,726,158

HARD BUTTER AND PROCESS THEREFOR

Walter M. Cochran, Highland Park, and Raymond F. McGee, Barrington, Ill., assignors to The Glidden Company, Cleveland, Ohio, a corporation of Ohio Application April 1, 1952, Serial No. 279,824

21 Claims. (Cl. 99—118)

This invention relates to an improved process for preparing hard butter and for preparing edible fats which on hydrogenation have characteristics of hard butter. It relates also to the products prepared by said process.

Hard butter is a glyceride fat which is widely marketed commercially for use in confectionery and various other edible products. Whereas hard butter was for many years derived by a "graining" process from coconut oil, in more recent years it has been prepared from imported oils such as palm-kernel and tucum oils. However, there are certain inherent difficulties in the source of supply of some of the imported oils and these oils are not as adaptable commercially as are other raw materials. Moreover, while various alternative processes have been made public, there are limitations on the desired properties and cost of most hard butters made from palm-kernel and tucum oils.

We have now found that a variety of whole, natural oils can be mixed and treated as described hereinafter so as to convert the entire mixture to hard butter. We have also found that not only whole natural oils but also various individual triglycerides obtained from a variety of sources can be mixed together and similarly converted entirely to hard butter. Accordingly, our process in its broadest aspects involves converting suitably selected mixtures of triglycerides entirely to hard butter by a catalytic rarrangement treatment in combination usually but not necessarily with a hydrogenation treatment.

It accordingly is an object of the invention to provide a catalytic treatment for the conversion of mixtures of triglycerides into fats having characteristics of hard butter.

It is another object to provide a catalytic process for converting mixtures of oils with or without added natural and/or synthetic triglycerides into products having characteristics of hard butter.

Still another object is to convert carefully selected and proportioned mixtures of natural triglyceride oils entirely to hard butter and like products characterized by their stability against catalytic rearrangement.

A further object is to treat a selected and proportioned mixture of triglycerides before, after or without hydrogenation by a catalytic rearrangement process, thereby to prepare triglyceride products having characteristics of hard butter.

These and other objects will be apparent from the following description of the invention taken in conjunction with the attached single figure of drawings which illustrates graphically the proportions between $C_{12}$, $C_{14}$, $C_{16}$ and $C_{18}$ fatty acids giving hard butter and like fats on catalytic rearrangement of triglycerides thereof.

An essential feature of merit in our invention resides in the knowledge that mixtures of triglycerides can be rearranged by a catalytic treatment to yield end products having different physical properties than those of the untreated mixture of glycerides. The essential feature of novelty resides in our discovery that the proportions and chemical constitution of the triglycerides in the mixture which is to be treated should be controlled within certain limits hereinafter set forth, so as to make it possible to convert the mixture catalytically into stable products having the characteristics of hard butter. Consequently, the invention involves the selection and treatment of mixtures of two or more natural oils, and mixtures of purified and/or synthetic triglycerides with or without natural oils.

Before proceeding to a more detailed description of our process, it is helpful to recognize the qualities and physical properties which characterize the broad class of materials known as "hard butter." One should appreciate at the outset that heretofore there have been no recognized or accepted specifications on the chemical constitution of "hard butters." Materials which have been bought and sold in the "hard butter" markets for many decades have been bought and sold primarily on the basis of physical properties, physical performance, odor, taste and other edible qualities. So long as a material met such qualifications, neither the buyer nor the seller needed to give much consideration to the chemical constitution of the material other than to be satisfied that it was a food product composed mainly of triglycerides. The principal physical properties considered in a "hard butter" are its softening point, melting point, fracture quality and freedom from sweating. Good "hard butters" should have a Wiley melting point between about 84° F. and 120° F., and should be hard and brittle at around normal room temperatures; that is, they should break sharply and suddenly at about 75° F., thereby having a brittle quality sometimes referred to as "snap." They should also be capable of standing at temperatures encountered in normal summer conditions without having liquid components thereof "sweat" or bleed out to the surface in the form of droplets or a visible liquid film.

The physical performance qualities of "hard butter" are numerous. One desirable quality is freedom from a "waxy" feeling or taste in the mouth; waxiness by this test is related somewhat to a narrow or sharp melting range although not entirely determined thereby. The other performance qualities are gauged largely by the performance of standard coatings, of which one typical formula is: 33% hard butter, 20% cocoa and 47% sugar, with usually .2% lecithin. Such a coating, when prepared from the "hard butter" being tested, should set or harden in a few minutes under the normal conditions encountered in the commercial practice of enrobing or otherwise applying the coating to a candy center or food product which is to be coated or iced. Thus, in enrobing a center with the coating, the coating should set in the few minutes which are allowed for the enrobed center to pass through a cooling tunnel maintained usualy at temperatures of 50° F. or 60° F. When the piece emerges from the tunnel, the coating should be firm enough to permit it to be packaged directly. The liquid coating which is used for such purposes should also have a viscosity at about 110°–130° F. or at temperatures near the melting point of the fat suitable for making smooth, uniform coatings, and should have a moderately short drip time after being applied as a coating on a food product such as a candy center. Another important performance quality is that of "stand-up." After a food product has been coated or iced, the coating and the "hard butter" therein should resist any appreciable changes in character when exposed at normal summer temperatures or at the temperatures which are apt to be encountered in the transportation of the coated products. This test for the coating is somewhat analogous to the "sweat" test for the hard butter itself, but a different characteristic is watched for in the "stand-up" test. For the purposes of this test, the coating should not soften so much as to stick to, stain or discolor the material in which the coated product is wrapped, and should not run from high points on the coated product to lower adjoining regions. Two other properties of coatings of the type represented by the foregoing typical formula which are tested to determine the quality of the "hard butter" in the coating are the hardness of the coating as measured by a penetration test at room temperature, and the gloss of the coating. A high gloss on the surface of the coating is desired, and it is further desired that the gloss be retained when the coating is allowed to stand at room temperature. Some hard butters are known to give a high initial gloss, but in the course of a day or two the coating becomes dull. Another very important performance quality of hard butter akin to "stand-up" is its ability to prevent, minimize or fail to induce "greying" and "bloom" when coatings containing cocoa are aged. Coatings which have turned grey, due frequently to the coated product having been heated and cooled alternately a number of times, are very unsightly and unappetizing, and customers generally refuse to buy the confection or return it to the seller on the misconception that it has become spoiled. A candy manufacturer is naturally very much opposed to the use of a "hard butter" which induces or will not prevent the "greying" of such coatings.

Miscellaneous qualifications of "hard butter" are freedom from odor, obtained by the conventional deodorizing treatments applied to fats and oils, and a bland taste, obtained by refining the "hard butter" to eliminate free fatty acids, soaps and other impurities almost completely. Free fatty acids may be tolerated in amounts of up to about .05%.

Such then are the qualities and properties which the "hard butter" trade expects of the materials which are offered as "hard butter." Nevertheless, the trade recognizes various grades of "hard butter", suitable for different end uses. While the different grades are not governed solely by Wiley melting points, yet for the present purposes of explaining our invention, we may classify them roughly into the following five groups having Wiley melting points around the following values:

| Grade | Wiley Melting Point, °F. |
| --- | --- |
| 1 | 84 |
| 2 | 95 |
| 3 | 105 |
| 4 | 113 |
| 5 | 120 |

Hereafter and in the claims where the term "hard butter" is used without further qualification, it will be intended to designate a material corresponding to one of the grades listed above and otherwise meeting present trade requirements in respect to the properties and qualities described above.

Our process of treating selected mixtures of glycerides to convert the mixture entirely to "hard butter" involves subjecting the mixture in liquid phase to the action of a low temperature alkali metal rearrangement catalyst at temperatures below about 250° F. under conditions favorable to the catalyst until a rearrangement reaction has been completed. The catalyst is then inactivated, preferably by washing the treated mixture with water, after which the treated mixture is dried. The selected mixtures of glycerides can be hydrogenated before the above-described treatment or afterward, and if the mixture has not already been so hydrogenated the catalytically-treated mixture is next hydrogenated to the desired extent by conventional methods. The resulting product is again dried and then bleached by conventional treatment and is finally deodorized by conventional treatment.

Now in elaboration of the foregoing procedure, the first point to be noted is that the mixture of glycerides which is to be treated must be selected so as to contain the proper proportions and kinds of fatty acids in the triglycerides thereof. This phase of the invention is described fully hereinafter.

The next point to be noted is that the catalyst is a low temperature rearrangement catalyst such as the alkali metal alkoxides having up to 4 carbon atoms, alkali metal hydrides such as sodium hydride, and numerous others such as are described in the Eckey U. S. Patent No. 2,442,536. Other alkaline compounds such as lithium aluminum hydride and calcium hydride have been found by us to be ineffective, as have such known catalysts as aluminum isopropylate. We are aware of the Gooding U. S. Patent No. 2,309,949 in which a variety of alkaline-reacting compounds are employed in combination with hydroxyl-carrying materials, but such catalyst and/or the high reaction temperatures involved in their use lead to different results than we obtain.

Small amounts of the low temperature rearrangement catalysts are employed in the treatment, as little as .02% of sodium methoxide by weight on the mixture of glycerides being effective when conditions are such that it is in an active condition. Most of the catalysts induce an exothermic reaction and such exothermicity becomes increasingly difficult to work with as the amount of catalyst is increased. Moreover, losses of glycerides tend to be increased and more saponification tends to occur. For these reasons we avoid the use of more than about 1% of catalyst. We prefer to use between about 0.1% and 0.5% of such active catalysts as sodium methoxide, sodium ethoxide or sodium hydride, and prefer a chemically equivalent percentage of other active low-temperature catalysts.

The catalyst is easily destroyed or inactivated by water, moisture, carbon dioxide and air. Accordingly, in order to provide treating conditions which are favorable to activity on the part of the catalyst, the mixture of triglycerides should be thoroughly dry, and contact with the moisture and carbon dioxide of the air must be prevented. We have found that an inert atmosphere such as hydrogen, nitrogen or vacuum is very effective. When an inert gaseous atmosphere of hydrogen or nitrogen is maintained over the mixture of glycerides, the treatment can be effectively carried out in a loosely-covered container. Preferably, however, the treatment is conducted in a vacuum chamber since by heating the mass to expeditious reaction temperatures in a vacuum of around 0.1 to 0.2 inch of mercury or lower, the glycerides can be dried effectively. Nitrogen can then be introduced for agitation and blanketing purposes to reduce the vacuum to about 1.5 inches' gauge pressure. Mechanical agitation can also be used. The container may be of iron, stainless steel, glass or aluminum. However, when aluminum is used, the amount of catalyst must generally be increased.

The catalyst is also destroyed by free acids and by peroxides. Accordingly, the glycerides which are to be treated should have been refined in advance with alkalis or otherwise to reduce the free fatty acid content to about .05% or lower, and to eliminate peroxides as far as possible. It should be understood that the provision of refined triglycerides and of other conditions favorable to the catalyst is done mainly in the interest of economizing the catalyst. The consequence of not making such provisions is simply that the quantity of catalyst which must be introduced to overcome all such unfavorable factors is wasted.

As indicated above, the temperature of the catalytic treatment can be varied over an appreciable range. When solvents are employed, temperatures as low as room temperature have been employed successfully. When the treatment is conducted in the absence of solvents, the temperature should at least be high enough to maintain the mass in the liquid phase throughout the catalytic treatment. The minimum temperature will, of course, then depend on the particular mixture of triglycerides which is being treated. Temperatures as high as 250° F. have been used successfully in vacuum equipment in the absence of solvents, but we prefer to use temperatures around 200°–240° F. in such vacuum equipment as they lead to low losses of material and to the formation of but little soap. Temperatures above about 250° F. are avoided because of catalyst decomposition and because of the exothermicity of the reaction and the disadvantageous results attendant thereon, as mentioned above.

The effectiveness of the catalyst and of the treatment can be determined by the changed physical properties of the mass, but we have also found that it is easily determined by the color of the mass of glycerides. The color of the mass changes from its original color to a reddish-brown color when the rearrangement reactions have been completed. If no such color change is observed within a few minutes after the catalyst has been added, it signifies that something has deactivated the catalyst. Frequently the initial addition of the catalyst almost cures the difficulty, and the rearrangement will be found to occur on the further addition of a small quantity of catalyst. Likewise, when only a slight color change is observed, it may signify that the catalyst was initially active but was soon inactivated. A further addition of catalyst will then cause the reaction to go to completion. We have observed that the rearrangement reaction goes to completion in the space of a few minutes if sufficient active catalyst is present. The addition of more catalyst under such conditions produces no further change, nor does holding the mass for a prolonged period of time cause any material change.

After the catalytically-induced rearrangement reaction has been completed, the mass can be cooled sufficiently to permit it to be washed with water or dilute acids so as to decompose the catalyst. Such washing is preferably done at temperatures around 170°–180° F. since there is little tendency at such temperatures for an emulsion to be formed. The washed material can then be stratified and the water separated from the mass of treated oil. The oil can then be dried by applying vacuum with or without further heating. The drying operation can, of course, be done in any of the other ways well known to those skilled in the art.

Where the treated glycerides contain unsaturated fatty acid radicals, the treated mass is next hydrogenated by any of the conventional methods in the presence of any suitable hydrogenation catalyst, the treatment being carried on until the unsaturation has been reduced to as low a value as may be desired. We generally prefer to hydrogenate the glycerides to an iodine value below about 5, but we have also found that some "hard butters" are improved in various properties by having somewhat more unsaturation therein; i. e., up to an iodine value of about 20. One way to achieve a controlled amount of unsaturation is to stop the hydrogenation when the desired amount of unsaturation has been obtained as indicated by a test for iodine value. Another way is to introduce an unsaturated oil into a mixture of saturated glycerides prior to rearrangement. The subsequent examples illustrate these features in more detail. As mentioned previously, the selected mixture of glycerides can be hydrogenated to the desired extent before being rearranged catalytically. The order in which the glycerides are treated by hydrogenation and by catalytic rearrangement at a given temperature seems to make no appreciable difference in the properties of the resulting hard butters when the rearrangement is carried to completion.

After the mass of glycerides has been treated by hydrogenation and by the catalytic rearrangement in whatever order one selects, the mass is next bleached by any of the customary methods and then is deodorized as a final step. The bleaching and deodorization treatments constitute no part of the present invention and are well known in the art, so that further description and discussion of the treatments is deemed unnecessary.

Without desiring to be restricted in any way by an expression of theory concerning the nature or mechanism of the reactions which occur during the catalytic treatment, we believe it is helpful to consider that the catalyst induces a reconstitution or rearrangement of initial triglycerides to establish a new equilibrium between symmetrical and unsymmetrical triglycerides. A few natural oils when subject to the rearrangement treatment exhibit little or no alteration in their physical properties, so we assume that the equilibrium existing in the oils prior to treatment was substantially no different than the equilibrium which tends to be established by the presence of the catalyst. However, when such oils are mixed with other triglycerides and then subjected to the rearrangement treatment, the resulting product exhibits significant changes in properties, showing that reaction has occurred, and indicating that the added triglyceride and the catalyst induced the formation of an altered equilibrium in the system.

Reverting now to the selection of the triglycerides which are to be treated in accordance with our invention, it will be apparent at the outset that one could not expect any indiscriminately-selected mixture of triglycerides to be converted wholly to "hard butter" by catalytic rearrangement. We have found that products having the characteristics of "hard butter" are obtained on rearrangement of mixtures of glycerides in which the $C_{12}$, $C_{14}$, $C_{16}$ and $C_{18}$ fatty acids constitute at least about 77% of the total quantity of fatty acids in the triglycerides of the mixture, any remainder being made up of small amounts of $C_6$, $C_8$, $C_{10}$ and $C_{20}$ fatty acids. We have further found that the $C_{12}$ and $C_{14}$ acids should be present in a weight ratio of between about 2 to 3.1 parts of $C_{12}$ acids per part of $C_{14}$ acids, and that the $C_{12}$, $C_{14}$, $C_{16}$ and $C_{18}$ acids should have the following percentage distribution based on the total weight of these four acids in the triglycerides:

| | Percent |
|---|---|
| $C_{12}+C_{14}$ | 37.5 to 80 |
| $C_{16}$ | 5 to 28 |
| $C_{18}$ | 15 to 47.5 |

Inasmuch as the molecular weight of any of the individual acids in these four classes changes little whether the acids are saturated or unsaturated, and since the final "hard butter" contains only small amounts of unsaturation, it is sufficient in computing the distributions to consider all of the acids in a given raw material as being saturated acids. That is, if soybean oil is one of the raw materials, the $C_{18}$ content thereof may be considered to be the sum of the weights of stearic, oleic, linoleic and linolenic acids therein. The foregoing numerical limits are based on this practice. Moreover, only the simple fatty acids are contemplated; hydroxy acids are not included and are undesirable in the resulting "hard butter." So far as $C_{20}$ acids are concerned, they constitute less than 8% of the total fatty acids in the common vegetable oils, and are usually less than 4%. We do not presently contemplate using fish oils in the preparation of "hard butters" in more than small amounts because of odor and taste difficulties, and we prefer to keep the total quantity of $C_{20}$ and higher acids below about 8% and preferably not in excess of about 4% by weight of the total fatty acids in the "hard butter." Small amounts of the $C_6$, $C_8$ and $C_{10}$ acids may be present but should individually amount to less than 10% of the total acids and should aggregate less than about 15%. Preferably these acids should be present in the following amounts:

| | Percent |
|---|---|
| $C_6$-caproic | 0–1 |
| $C_8$-caprylic | 2–6 |
| $C_{10}$-capric | 3–6 |

Thus the preferred aggregate percentage of these acids is from 5 to 13%.

The foregoing limitations on kinds, amounts and proportions of fatty acids may be summarized as follows:

|  | Preferred | Permissible |
|---|---|---|
| $C_6$ acid | 0–1% | 0–10% |
| $C_8$ acid | 2–6% | 0–10% |
| $C_{10}$ acid | 3–6% | 0–10% |
| $C_6+C_8+C_{10}$ | 5–13% | 0–15% |
| $C_{20}$ and higher | 4% or less | 0–8% |
| $C_6+C_8+C_{10}+C_{20}$ and higher | 5–17% | 0–23% |
| $C_{12}+C_{14}+C_{16}+C_{18}$ | remainder | remainder |
| Ratio $C_{12}:C_{14}$ | 2:1 to 3.1 to 1 | |

|  | Fatty Acid Distribution in Percent of Remainder | |
|---|---|---|
|  | Preferred, Percent | Permissible, Percent |
| $C_{12}+C_{14}$ | 40–70 | 37.5 to 80 |
| $C_{16}$ | 5–25 | 5–28 |
| $C_{18}$ | 21–47.5 | 15–47.5 |

The attached figure of drawings is a three-component graph in which the three components are designated as $C_{12}+C_{14}$, $C_{16}$ and $C_{18}$. These refer to the fatty acids which contain the indicated number of carbon atoms and which correspond to the fatty acid radicals in the triglycerides which compose the product. The field enclosed within the lines which intersect at the points A, B, C, D and E represents the distribution of $C_{12}+C_{14}$, $C_{16}$ and $C_{18}$ fatty acids which we have found to be permissible for the intended purposes of our invention. The opposite pairs of straight lines bounding said field on the graph correspond to the numerical limits set forth above in the column headed "Permissible"; namely, $C_{12}+C_{14}$ _____ 37.5 (line CD) to 80% (point A).
$C_{16}$ _____ 5% (line AE) to 28% (line BC).
$C_{18}$ _____ 15% (line AB) to 47.5% (line DE).

Various points have been plotted within the enclosed field and each is numbered to correspond to the example describing such composition. Each of such points represents only the distribution of the $C_{12}+_{14}$, $C_{16}$ and $C_{18}$ acids corresponding to the fatty acid radicals in the triglycerides of the mass treated in the indicated example, exclusive of other acids or acid radicals of shorter or longer chain length therein. The acids corresponding to the fatty radicals in triglycerides are hereinafter referred to as "equivalent acids."

Example 1

700 parts of refined and bleached coconut oil and 300 parts of refined bleached cottonseed oil were mixed together in a stainless steel deodorizer unit and heated to 225° F.–235° F. under a vacuum of 0.1" to 0.2" absolute pressure. Nitrogen at 10-lb. gauge pressure was bubbled through the charge for agitation and blanketing purposes for a period of about 5 minutes. Mechanical agitation can also be used with or without nitrogen agitation. Sodium methylate in an amount of 0.10% by weight of the mixed oils was prepared as a slurry in about 10 parts of the oil charge, and the slurry was drawn into the batch after which nitrogen pressure was increased to 50 pounds to provide vigorous stirring. The reaction was continued for about 7 minutes, after which time it was judged from the reddish-brown color that the reaction had been completed. The nitrogen pressure was then decreased to 10 lbs. pressure and the oil was cooled to about 190° F. It was then transferred to a neutralizing tank where 10% of water by weight was added to the oil. The water was added with rapid agitation over a period of about 15 minutes. The agitation was then stopped and the batch was allowed to settle for 30 minutes. A water spray amounting to 3% by weight of the oil was then given to the batch and settling was continued for an additional three hours. At the end of the settling period the water was drawn off the bottom of the kettle and the batch again washed with a water spray and again settled in like manner. Then the oil was vacuum dried, bleached and hydrogenated to an iodine value below 1.0. The resulting product had a color of 1.0R 10Y Lovibond, a Wiley melting point of 110° F. and a setting point of 36.0° C., and was judged to be a good quality "hard butter."

The mixture of oils before treatment with the catalyst contained equivalent lower fatty acids in its glycerides in approximately the following amounts:

| | Percent |
|---|---|
| $C_6$ | 0.35 |
| $C_8$ | 5.6 |
| $C_{10}$ | 4.3 |

The equivalent higher fatty acids in the triglycerides, exclusive of all others, were distributed about as follows:

| | Percent |
|---|---|
| $C_{12}$ | 37.7 |
| $C_{14}$ | 14.1 |
| $C_{16}$ | 14.2 |
| $C_{18}$ | 34.0 |
| $C_{12}+C_{14}$ | 51.8 |

$$C_{12}/C_{14}=2.68$$

Example 2

Bleached, refined and hydrogenated palm kernel, palm and soybean oils, all having iodine values below 1, were mixed together in the following proportions:

| | Percent |
|---|---|
| Palm kernel oil | 72.15 |
| Palm oil | 16.71 |
| Soybean oil | 11.14 |
| | 100.00 |

The setting point of the mixture was 49.8° C. The mixture was rearranged by heating at 220° F. in glass under a nitrogen blanket, while being stirred continuously, with 0.3% sodium methoxide for one-half hour. The mass was then cooled and washed three times with water, bleached and deodorized. The resulting fat had a melting point of 110° F. and a setting point of 37.5° C.

The mixture of oils before rearrangement contained equivalent lower fatty acids in its triglycerides in about the following amounts:

| | Percent |
|---|---|
| $C_6$ | None |
| $C_8$ | 2.1 |
| $C_{10}$ | 4.32 |

The equivalent higher fatty acids, exclusive of all others, were proportioned about as follows:

| | Percent |
|---|---|
| $C_{12}$ | 39.3 |
| $C_{14}$ | 12.6 |
| $C_{16}$ | 13.6 |
| $C_{18}$ | 34.5 |
| | 100.0 |

$$C_{12}+C_{14}=51.9$$
$$C_{12}/C_{14}=3.1$$

Example 3

Refined, bleached and hydrogenated tucum, cottonseed and palm oils, all having iodine values below 1, were mixed together in the following proportions:

| | Percent |
|---|---|
| Tucum oil | 68.4 |
| Cottonseed oil | 25.7 |
| Palm oil | 5.9 |
| | 100.0 |

The mixture was rearranged by heating at 220° F. for one-half hour in glass under a nitrogen blanket, while being stirred continuously, with 0.3% sodium methoxide. The mass was then washed three times with water, bleached and deodorized. The resulting fat had a melting point of 112° F. and a setting point of 37.2° C.

The mixture of oils before rearrangement contained equivalent lower fatty acids in its triglycerides in about the following amounts:

| | Percent |
|---|---|
| $C_6$ | None |
| $C_8$ | 0.8 |
| $C_{10}$ | 3.0 |

The equivalent higher fatty acids, exclusive of all others, were proportioned about as follows:

| | Percent |
|---|---|
| $C_{12}$ | 35.2 |
| $C_{14}$ | 15.6 |
| $C_{16}$ | 12.5 |
| $C_{18}$ | 36.7 |
| | 100.0 |

$C_{12}+C_{14}=50.8\%$
$C_{12}/C_{14}=2.26$

Example 4

Fifty-five parts of refined, bleached coconut oil was hydrogenated to an iodine value below 1, and was mixed with 45 parts of refined and bleached palm oil which had been hydrogenated to an iodine value below 1. The setting point of the resulting mixture was 50.4° C. The mixture was rearranged by heating at 220° F. for one-half hour with 0.3% sodium methoxide, after which it was cooled to about 180° F. and washed three times with water. It was then bleached and deodorized. The rearranged fat had a Wiley melting point of 113° F. and a setting point of 37.6° C., and was judged to be satisfactory for use as a hard butter.

The equivalent lower fatty acid distribution in the mixture before rearrangement was calculated to be about as follows:

| | Percent |
|---|---|
| $C_6$ | 0.26 |
| $C_8$ | 4.6 |
| $C_{10}$ | 3.4 |

The distribution of the equivalent higher fatty acids, exclusive of the foregoing, was about as follows:

| | Percent |
|---|---|
| $C_{12}$ | 31.1 |
| $C_{14}$ | 11.3 |
| $C_{16}$ | 26.8 |
| $C_{18}$ | 30.8 |
| | 100.0 |

$C_{12}+C_{14}=42.4\%$
$C_{12}/C_{14}=2.79$

Example 5

Seventy parts of refined, bleached coconut oil was mixed with 30 parts of refined, bleached palm oil and the resulting mixture was rearranged by heating at 150°–155° F. for 3.5 hours with 0.3% sodium methoxide. At the end of the treatment, the resulting mass was washed with water to destroy the catalyst and was subsequently bleached, hydrogenated to an iodine value below 1, was refined with alkali and finally was deodorized. The resulting fat had a Wiley melting point of 109.5° F., a setting point of 35.4° C. and was satisfactory in other characteristics for use as a hard butter. The equivalent lower fatty acids in the original mixture were distributed about as follows:

| | Percent |
|---|---|
| $C_6$ | 0.35 |
| $C_8$ | 5.6 |
| $C_{10}$ | 4.3 |

The distribution of equivalent $C_{12}$–$C_{18}$ acids, exclusive of all others, was about as follows:

| | Percent |
|---|---|
| $C_{12}$ | 38.9 |
| $C_{14}$ | 14.8 |
| $C_{16}$ | 21.75 |
| $C_{18}$ | 24.55 |
| | 100.00 |

$C_{12}+C_{14}=53.7\%$
$C_{12}/C_{14}=2.64$

Example 6

Soybean, cottonseed and coconut oils, all of which had been refined, bleached and hydrogenated to an iodine value below 1, and dried, were mixed together in the following proportions:

| | Percent |
|---|---|
| Soybean | 30.4 |
| Cottonseed | 9.1 |
| Coconut | 60.5 |

The setting point of the mixture was found to be 53.9° C. The mixture was rearranged by heating at 220° F. in glass under a nitrogen blanket for one-half hour in the presence of 0.3% sodium methoxide while being agitated mechanically. At the end of that time the treated mass was cooled to about 180° F., and was washed three times with water, and then was bleached and deodorized. The resulting fat had a Wiley melting point of 112.5° F. and a setting point of 37.5° C., and was judged to be satisfactory for use as "hard butter."

The distribution of the equivalent lower fatty acids in the mixture before rearrangement was about as follows:

| | Percent |
|---|---|
| $C_6$ | 0. |
| $C_8$ | 4.9 |
| $C_{10}$ | 3.8 |

The distribution of the equivalent $C_{12}$–$C_{18}$ fatty acids, exclusive of the above, was about:

| | Percent |
|---|---|
| $C_{12}$ | 32.2 |
| $C_{14}$ | 11.9 |
| $C_{16}$ | 10.4 |
| $C_{18}$ | 45.5 |

$C_{12}+C_{14}=44.1\%$
$C_{12}/C_{14}=2.7$

Example 7

Equal parts of refined, bleached and dried coconut and tucum oils were mixed together and then rearranged by heating in glass under a nitrogen blanket at 220° F. for ½ hour with 0.3% sodium methoxide. The treated mass was then cooled and washed three times with water, and was subsequently hydrogenated to an iodine value below 1, then bleached and deodorized. The resulting fat had a Wiley melting point of 94.5° F. and a setting point of 30.3° C., and was judged to be useful as a "hard butter."

The mixture of oils prior to rearrangement had a saponification value of 250.7 and contained approximately the following amounts of equivalent lower fatty acids in its triglycerides:

| | Percent |
|---|---|
| $C_6$ | 0.25 |
| $C_8$ | 4.65 |
| $C_{10}$ | 5.3 |

Its equivalent higher fatty acid content, exclusive of the foregoing, was about as follows:

|  | Percent |
|---|---|
| $C_{12}$ | 54.2 |
| $C_{14}$ | 22.0 |
| $C_{16}$ | 8.4 |
| $C_{18}$ | 15.4 |
|  | 100.0 |

$$C_{12}+C_{14}=76.2\%$$
$$C_{12}/C_{14}=2.47$$

*Example 8*

Eighty parts of refined, bleached and dried palm kernel oil was mixed with 20 parts of refined, bleached and dried soybean oil. The resulting mixture was treated with 0.3% sodium methoxide in glass under a nitrogen blanket and with continuous mechanical agitation for 3 hours at 150° F. The treated mass was then washed with water which contained a small amount of orthophosphoric acid, to destroy the catalyst, after which the oil was bleached and hydrogenated to an iodine value of 1.2. The resulting fat had a Wiley melting point of 105° F. and a setting point of 34.1° C.

The mixture of oils prior to rearrangement had a saponification value of 239.0 and contained approximately 2.4% of equivalent $C_8$ fatty acids in its triglycerides and about 4.8% of equivalent $C_{10}$ fatty acids. The distribution of the remaining equivalent fatty acids, exclusive of the foregoing, was about as follows:

|  | Percent |
|---|---|
| $C_{12}$ | 43.1 |
| $C_{14}$ | 13.9 |
| $C_{16}$ | 7.1 |
| $C_{18}$ | 35.9 |
|  | 100.0 |

$$C_{12}+C_{14}=57.0\%$$
$$C_{12}/C_{14}=2.78 \text{ to } 1$$

*Example 9*

Seventy parts of refined, bleached and hydrogenated coconut oil having a Wiley melting point of 110° F. and thirty parts of refined, bleached and hydrogenated cottonseed oil were mixed together and then rearranged in glass under nitrogen with 0.3% sodium methoxide at 220° F., the entire mass being stirred mechanically during the treatment with the catalyst. The treatment was continued for one-half hour after introduction of the catalyst, then the mass was cooled to about 180° F. and washed three times with water, and after separation of the wash water the treated oil was bleached. The rearranged fat had a setting point of 36.5° F. The distribution of equivalent fatty acids was the same as that of Example 1.

*Example 10*

A mixture identical to that of Example 9 was treated and rearranged in the same manner as there described except that 0.3% of sodium ethoxide was employed as catalyst. The setting point of the rearranged fat, after being washed and bleached as in Example 9, was 37.2° F.

*Example 11*

Seventy parts of refined, bleached coconut oil was hydrogenated to an iodine value below 1 and was mixed with thirty parts of refined, bleached cottonseed oil which had been hydrogenated to an iodine value below 1. The mixture was rearranged at 220° F. with 0.3% sodium methoxide. Periodically, samples were withdrawn and the catalyst inactivated with ten parts of water. Rearranged fat was washed three times with water. It was then bleached and deodorized.

| Time in Minutes after catalyst addition | Setting Point Low, ° C. | Setting Point High, ° C. |
|---|---|---|
| 0 | 44.2 | 50.8 |
| 10 | 30.9 | 35.0 |
| 25 | 31.1 | 34.8 |
| 60 | 31.1 | 34.9 |

Thus it is here shown that the reaction had been completed within ten minutes.

*Example 12*

600 grams of a mixture composed of 360 grams (60%) refined, hydrogenated coconut oil, 150 grams (25%) refined, hydrogenated cottonseed oil and 90 grams (15%) refined liquid palm oil was treated in glass with 0.3% sodium methoxide at 220° F. for ½ hour under nitrogen at atmospheric pressure while the whole mass was being stirred. At the end of the time, the mass was cooled and washed three times with water, then was dried, bleached and deodorized in vacuum. The rearranged fat had a setting point of 33.7° C., and was judged to be a good "hard butter." By reason of the presence of liquid palm oil in the mixture of oils, the rearranged fat had an iodine value of about 8.

*Example 13*

A mixture composed of 80 parts refined, bleached palm kernel oil, 20 parts refined, bleached soya bean oil and 10 parts xylol was treated at room temperature (70°–75° F.) with .3% sodium methoxide in a glass container. The mass was stirred mechanically and continuously for 12 hours. No color change had occurred by that time so an additional 0.2% of the catalyst was added and the treatment was continued for an additional 14 hours. The reaction was judged to be complete at that time and the catalyst was inactivated by washing the mass with water. Subsequently, the solvent was distilled off and the fat was hydrogenated to an iodine value of 0.5 and deodorized. The resulting product has a setting point of 34.4° C., a Wiley melting point of 108.5° F. and was judged to be a useful "hard butter."

*Example 14*

A mixture of 70 parts refined, bleached and fully hydrogenated cottonseed oil was treated in a glass container at 220° F. with 0.9% of sodium hydride which had been pulverized under benzene. The mixture was stirred continuously and was protected from the atmosphere by a nitrogen blanket. After two hours, the mass was cooled, washed with water and dried. The resulting fat had a setting point of 39.2° C.

*Example 15*

Fifty parts of refined coconut oil and fifty parts of refined cottonseed oil were mixed together and hydrogenated to an iodine value of 16.0. After having the hydrogenation catalyst filtered out, the mass was rearranged in glass under nitrogen by heating and stirring with 0.3% sodium methoxide at 220° F. for one-half hour. The rearranged mass was then cooled, washed with water to remove the catalyst and dried. The resulting product had a Wiley melting point of 104.5° F., a setting point of 35.9° C., an iodine value of 16, and was judged to be a satisfactory "hard butter".

In the foregoing examples, the setting points of the products prepared therein were determined in a manner similar to that described in the U. S. Patent No. 2,047,530.

From the foregoing description and examples of the invention, it should be apparent that the aims and purposes of the invention are secured by rearranging mixtures of oils and/or fats which are composed essentially of triglycerides of fatty acids having between 6 and 20 carbons, the mixture before rearrangement having the $C_6$ to $C_{10}$ acids and the $C_{12}$ to $C_{18}$ acids within the limits hereinbefore described. The source of the triglycerides which constitute such mixture is of little significance and whole natural oils may be used by themselves in admixtures which yield the appropriate kinds and proportions of fatty acid radicals, or purified and isolated triglycerides, or synthetic triglycerides may likewise be mixed with them or with each other or with distillation, crystallization or other fractions of whole natural oils. The source of the triglycerides used in such initial mixtures is of significance only to the extent that it may be the antecedent of taste, flavor, odor or other matters relating to edibility, whereas other sources of the same triglycerides might avoid or minimize those matters. Those skilled in the art, being well versed in such matters, can readily select appropriate sources of triglycerides which on admixture in accordance with the principles herein set forth and on subsequent rearrangement will give "hard butters" of the desired edible qualities. It will accordingly be understood that a multitude of combinations of animal and/or vegetable oils and fats (these terms being here used in their broadest recognized meaning as designating triglycerides and/or mixtures of triglycerides) are possible within the principles of our invention, and that the foregoing examples illustrate only a few of the many combinations which can be employed.

In respect to carrying out rearrangements in solvents, it should be understood that the choice of kind(s) and amount(s) of solvent should be such as to maintain all of the triglycerides in solution throughout the course of the rearrangement treatment. When hydrogenated oils or fats are being so rearranged, it may be necessary to add solvent occasionally as the rearrangement proceeds to ensure the continued solution of more-difficultly-soluble triglycerides formed in the presence of the catalyst.

It should be recognized, of course, that the fats resulting from the rearrangement of two or more different mixtures of triglycerides can be blended with each other and/or with "hard butters" which have been prepared by any of the methods already known in the art, and that the latter "hard butters" may be blended with the product of a single rearranged mixture of glycerides.

The products which have been prepared in accordance with the principles of our process are characterized by their stability against further low-temperature catalytic rearrangement when treated alone. This, we assume, is because all of the triglycerides contained in the product have already been brought to a stable equilibrium, so that when again subjected to the action of low-temperature rearrangement catalysts, in the absence of any added triglycerides, they remain unaffected by the catalyst. Of course, where other triglycerides have been added to the product, as when the rearranged product is blended with other "hard butters", such added triglycerides are apt to upset the initial equilibrium in the rearranged product, and the blended mixture would be apt to exhibit further rearrangement when again treated with a low temperature catalyst. The stability of our rearranged products distinguishes them from prior art "hard butters" which have not been brought to a stable equilibrium in the presence of a low-temperature rearrangement catalyst.

Having described the invention, what we claim is:

1. The method of preparing edible products composed essentially of fatty acid triglycerides and having the characteristics of hard butter when the unsaturation in the fatty acid radicals thereof is less than corresponds to an iodine value of about 20, said method comprising: mixing together even-numbered, simple fatty acid triglycerides whose fatty acid radicals contain at least 6 carbon atoms and aggregately comprise at least the 12, 14, 16 and 18 carbon fatty acyl groups, respectively, said glycerides being mixed in proportions such that the saturated acids corresponding to the fatty acid radicals of the glycerides in said mixture have the following aggregated proportions, when expressed in percentage by weight of the total:

| | Percent |
|---|---|
| $C_6$ acids | 0–10 |
| $C_8$ acids | 0–10 |
| $C_{10}$ acids | 0–10 |
| $C_6+C_8+C_{10}$ acids | 0–15 |
| $C_{20}$ and higher acids | 0–8 |
| $C_{12}$ to $C_{18}$ acids, inclusive | Remainder | said glycerides being further proportioned (a) so that the saturated acids corresponding to the $C_{12}$ to $C_{18}$ radicals, inclusive, in said mixture have the following distribution in percentage by weight of said remainder:

| | Percent |
|---|---|
| $C_{12}+C_{14}$ acids | 37.5–80 |
| $C_{16}$ acids | 5–28 |
| $C_{18}$ acids | 15–47.5 | and (b) so that the saturated acids corresponding to the $C_{12}$ and $C_{14}$ radicals, inclusive, in said mixture have a ratio between 2 to 1 and 3.1 to 1, inclusive; thereafter treating said mixture of triglycerides while maintained in homogenous liquid phase at temperatures below about 250° F. with a small, effective amount less than about 1% of a low-temperature rearrangement catalyst under rearrangement conditions favorable to said catalyst at least until the rearrangement reactions promoted by said catalyst have been substantially completed; and thereafter inactivating the catalyst and recovering the treated mass of glycerides.

2. The method of preparing edible products composed essentially of fatty acid triglycerides and having the characteristics of hard butter when the unsaturation in the fatty acid radicals thereof is less than corresponds to an iodine value of about 5, said method comprising: mixing together even-numbered, simple fatty acid triglycerides whose fatty acid radicals contain at least 6 carbon atoms and aggregately comprise at least the 12, 14, 16 and 18 carbon fatty acyl groups, respectively, said glycerides being mixed in proportions such that the saturated acids corresponding to the fatty acid radicals of the glycerides in said mixture have the following aggregated proportions, when expressed in percentage by weight of the total:

| | Percent |
|---|---|
| $C_6$ acids | 0–10 |
| $C_8$ acids | 0–10 |
| $C_{10}$ acids | 0–10 |
| $C_6+C_8+C_{10}$ acids | 0–15 |
| $C_{20}$ and higher acids | 0–8 |
| $C_{12}$ to $C_{18}$ acids, inclusive | Remainder | said glycerides being further proportioned (a) so that the saturated acids corresponding to the $C_{12}$ to $C_{18}$ radicals, inclusive, in said mixture have the following distribution in percentage by weight of said remainder:

| | Percent |
|---|---|
| $C_{12}+C_{14}$ acids | 37.5–54 |
| $C_{16}$ acids | 5–28 |
| $C_{18}$ acids | 15–47.5 | and (b) so that the saturated acids corresponding to the $C_{12}$ and $C_{14}$ radicals, inclusive, in said mixture have a ratio between 2 to 1 and 3.1 to 1, inclusive; thereafter treating said mixture of triglycerides while maintained in homogeneous liquid phase at temperatures below about 250° F. with a small, effective amount less than about 1% of an alkali-metal alkoxide catalyst having up to 4 carbons under rearrangement conditions favorable to said catalyst at least until the rearrangement reactions promoted by said catalyst have been substantially completed; and thereafter inactivating the catalyst and recovering the treated mass of glycerides.

3. The method as claimed in claim 2 wherein the distribution in said mixture of the fatty acids corresponding to the $C_{12}$ to $C_{18}$ fatty acid radicals, inclusive, in percentage by weight of said remainder is:

| | Percent |
|---|---|
| $C_{12}+C_{14}$ acids | 40 to 54 |
| $C_{16}$ acids | 5 to 25 |
| $C_{18}$ acids | 21 to 47.5 |

4. The method as claimed in claim 3 wherein the aggregated proportions of the saturated acids corresponding to the fatty acid radicals of the glycerides in said mixture is:

| | Percent |
|---|---|
| $C_6$ acids | 0 to 1 |
| $C_8$ acids | 2 to 6 |
| $C_{10}$ acids | 3 to 6 |
| $C_6+C_8+C_{10}$ acids | 5 to 13 |
| $C_{20}$ and higher acids | 0 to 4 |
| $C_{12}$ to $C_{18}$ acids, inclusive | Remainder |

5. The method of preparing edible products composed essentially of fatty acid triglycerides and having the characteristics of hard butter when the unsaturation in the fatty acid radicals thereof is less than corresponds to an iodine value of about 5, said method comprising: providing a mixture of at least two natural glyceride oils which have been refined with alkalis and which are composed of even-numbered, simple fatty acid triglycerides whose fatty acid radicals contain at least 6 carbon atoms and aggregately comprise at least the 12, 14, 16 and 18 carbon fatty acyl groups, respectively, said glyceride oils being mixed in proportions such that the saturated acids corresponding to the fatty acid radicals of the glycerides in said mixture have the following aggregated proportions, when expressed in percentage by weight of the total:

| | Per cent |
|---|---|
| $C_6$ acids | 0–10 |
| $C_8$ acids | 0–10 |
| $C_{10}$ acids | 0–10 |
| $C_6+C_8+C_{10}$ acids | 0–15 |
| $C_{20}$ and higher acids | 0–8 |
| $C_{12}$ to $C_{18}$ acids, inclusive | Remainder | said oils being further proportioned (a) so that the saturated acids corresponding to the $C_{12}$ to $C_{18}$ radicals, inclusive, in said mixture have the following distribution, in percentage by weight of said remainder:

| | Per cent |
|---|---|
| $C_{12}+C_{14}$ acids | 37.5–80 |
| $C_{16}$ acids | 5–28 |
| $C_{18}$ acids | 15–47.5 | and (b) so that the saturated acids corresponding to the $C_{12}$ and $C_{14}$ radicals in said mixture have a ratio between 2 to 1 and 3.1 inclusive; hydrogenating said mixture of oils when necessary to reduce the iodine value to a value below about 5; thereafter treating said mixture of triglyceride oils while maintained in homogeneous liquid phase at temperatures below about 250° F. with a small, effective amount less than about 1% of an alkali-metal alkoxide catalyst having up to 4 carbons under rearrangement conditions favorable to said catalyst at least until the rearrangement reactions promoted by said catalyst have been substantially completed; and thereafter inactivating the catalyst and recovering the treated mass of triglycerides.

6. The method as claimed in claim 5 wherein the aggregated proportions of the saturated acids corresponding to the fatty acid radicals of the glycerides in said mixture is:

| | Per cent |
|---|---|
| $C_6$ acids | 0 to 1 |
| $C_8$ acids | 2 to 6 |
| $C_{10}$ acids | 3 to 6 |
| $C_6+C_8+C_{10}$ acids | 5 to 13 |
| $C_{20}$ and higher acids | 0 to 4 |
| $C_{12}$ to $C_{18}$ acids, inclusive | Remainder |

7. The method as claimed in claim 6 wherein the catalyst is sodium methoxide in an amount between about 0.1% and 0.5%.

8. The method as claimed in claim 7 wherein the treatment with catalyst is carried out under vacuum at temperatures between about 200° F. and 240° F.

9. The method as claimed in claim 5 wherein the distribution in said mixture of the fatty acid radicals corresponding to the $C_{12}$ to $C_{18}$ fatty acids, inclusive, in percentage by weight of said remainder is:

| | Per cent |
|---|---|
| $C_{12}+C_{14}$ acids | 40 to 70 |
| $C_{16}$ acids | 5 to 25 |
| $C_{18}$ acids | 21 to 47.5 |

10. The method as claimed in claim 9 wherein the catalyst is sodium methoxide in an amount between about 0.1% and 0.5%.

11. The method as claimed in claim 5 wherein the aggregated proportions of the saturated acids corresponding to the fatty acid radicals of the glycerides in said mixture is:

| | Per cent |
|---|---|
| $C_6$ acids | 0 to 1 |
| $C_8$ acids | 2 to 6 |
| $C_{10}$ acids | 3 to 6 |
| $C_6+C_8+C_{10}$ acids | 5 to 13 |
| $C_{20}$ and higher acids | 0 to 4 |
| $C_{12}$ to $C_{18}$ acids, inclusive | Remainder | and wherein the distribution in said mixture of the fatty acid radicals corresponding to the $C_{12}$ to $C_{18}$ fatty acids, inclusive, in percentage by weight of said remainder is:

| | Per cent |
|---|---|
| $C_{12}+C_{14}$ acids | 40 to 54 |
| $C_{16}$ acids | 5 to 25 |
| $C_{18}$ acids | 21 to 47.5 |

12. The method as claimed in claim 11 wherein the catalyst is sodium methoxide in an amount between about 0.1% and 0.5%.

13. The method of preparing edible products composed essentially of fatty acid triglycerides and having the characteristics of hard butter when the unsaturation in the fatty acid radicals thereof is less than corresponds to an iodine value of about 5, said method comprising: mixing together even-numbered, simple fatty acid triglycerides whose fatty acid radicals contain at least 6 carbon atoms and aggregately comprise at least the 12, 14, 16 and 18 carbon fatty acyl groups, respectively, said glycerides being mixed in proportions such that the saturated acids corresponding to the fatty acid radicals of the glycerides in said mixture have the following aggregated proportions, when expressed in percentage by weight of the total:

| | Percent |
|---|---|
| $C_6$ acids | 0–10 |
| $C_8$ acids | 0–10 |
| $C_{10}$ acids | 0–10 |
| $C_6+C_8+C_{10}$ acids | 0–15 |
| $C_{20}$ and higher acids | 0–8 |
| $C_{12}$ and $C_{18}$ acids, inclusive | Remainder | said glycerides being further proportioned (a) so that the saturated acids corresponding to the $C_{12}$ to $C_{18}$ radicals, inclusive, in said mixture have the following distribution in percentage by weight of said remainder:

| | Percent |
|---|---|
| $C_{12}+C_{14}$ acids | 37.5–54 |
| $C_{16}$ acids | 5 –28 |
| $C_{18}$ acids | 15 –47.5 | and (b) so that the saturated acids corresponding to the $C_{12}$ and $C_{14}$ radicals, inclusive, in said mixture have a ratio between 2 to 1 and 3.1 to 1, inclusive; thereafter treating said mixture of triglycerides while maintained in homogeneous liquid phase at temperatures below about 250° F. with a small, effective amount less than about 1% of an alkali-metal alkoxide catalyst having up to 4 carbons under rearrangement conditions favorable to said catalyst at least until the rearrangement reactions promoted by said catalyst have been substantially completed; inactivating the catalyst and recovering the treated mass of glycerides; and hydrogenating the recovered mass when necessary to reduce the iodine value to a value below about 5.

14. The method as claimed in claim 13 wherein the mixture of glycerides is composed of a mixture of at least two natural oils which have been alkali-refined.

15. The method as claimed in claim 14 wherein the catalyst is sodium methoxide in an amount between about .1% and .5%.

16. The method as claimed in claim 13 wherein the aggregated proportions of the saturated acids corresponding to the fatty acid radicals of the glycerides in said mixture is:

| | Percent |
|---|---|
| $C_6$ acids | 0 to 1 |
| $C_8$ acids | 2 to 6 |
| $C_{10}$ acids | 3 to 6 |
| $C_6+C_8+C_{10}$ acids | 5 to 13 |
| $C_{20}$ and higher acids | 0 to 4 |
| $C_{12}$ to $C_{18}$ acids, inclusive | Remainder |

17. The method as claimed in claim 16 wherein the mixture of glycerides is composed of a mixture of at least two natural oils which have been alkali-refined.

18. The method as claimed in claim 17 wherein the catalyst is sodium methoxide in an amount between about .1% and .5%.

19. The method as claimed in claim 13 wherein the distribution in said mixture of the fatty acid radicals corresponding to the $C_{12}$ to $C_{18}$ fatty acids, inclusive, in percentage by weight of said remainder is:

| | Percent |
|---|---|
| $C_{12}+C_{14}$ acids | 40 to 54 |
| $C_{16}$ acids | 5 to 25 |
| $C_{18}$ acids | 21 to 47.5 |

20. The method as claimed in claim 19 wherein the mixture of glycerides is composed of a mixture of at least two natural oils which have been alkali-refined.

21. The method as claimed in claim 20 wherein the catalyst is sodium methoxide in an amount of between about 0.1% and 0.5%.

References Cited in the file of this patent
UNITED STATES PATENTS

| | | |
|---|---|---|
| 2,238,441 | Drew | Apr. 15, 1941 |
| 2,442,532 | Eckey | June 1, 1948 |
| 2,442,536 | Eckey | June 1, 1948 |
| 2,667,418 | Barsky et al. | Jan. 26, 1954 |

OTHER REFERENCES

Bailey: Industrial Oil and Fat Products, 2nd ed., 1951, p. 135.